United States Patent Office

3,564,382
Patented Feb. 16, 1971

3,564,382
COULOMETER CONTROLLED BATTERY CHARGERS
Thomas Elston King, Ronald Lloyd Haines, and Howard Robert Braun, Ottawa, Ontario, and Ronald Denis Ouellette, Windsor, Ontario, Canada, and Jack Rodney McKague, Baden, Sollingen, Germany, assignors to Her Majesty the Queen in right of Canada as represented by the Minister of National Defence
Filed Sept. 13, 1968, Ser. No. 760,746
Claims priority, application Canada, Sept. 15, 1967, 144
Int. Cl. H02j 7/02
U.S. Cl. 320—39        11 Claims

ABSTRACT OF THE DISCLOSURE

Battery charging circuits using a coulometer in series with the battery to sense the amount of charge going into or out of the battery. The coulometer provides an abrupt rise in voltage upon passage of a predetermined net amount of charge therethrough, e.g. when the battery has been fully charged. This voltage actuates means to terminate further charging either by tripping a relay or deactivating a unijunction oscillator which normally provides gating pulses to an SCR in series with the battery and coulometer. Means are provided for causing a timed overcharge or an intermittent pulse type of overcharge.

BACKGROUND OF THE INVENTION

This invention relates to coulometer controlled battery charges which are particularly useful for charging nickel-cadmium batteries.

Heretofore, for the lack of a suitable charge control system, users of nickel-cadmium batteries have experienced difficulties in fully exploiting some of the batteries capabilities such as:

(a) their ability to accept charge rapidly,
(b) their potentially reliable long life operation (even under very demanding duty cycles),
(c) their minimal maintenance possibilities.

Complicating factors in the design of an effective charging system are:

(a) There is no simple way to determine the state-of-charge of a nickel-cadmium battery (battery voltage characteristics are essentially flat during charging and there is no change in the specific gravity of the electrolyte during charging).

(b) To effectively recharge the battery it is necessary to use impressed voltages at ranges where thermal run-a-way is easily induced. This is to say, that in order to restore the full capacity of the battery and to balance the cell capacities, the battery, as it approaches full capacity, must be charged for a period of time at its gassing potential. This portion of the charging cycle where the individual cells have reached the gassing potential is called overcharging. Excessive overcharging results in battery overheating culminating in thermal run-a-way when prolonged. Unfortunately, even when thermal run-a-way does not result, periods of overheating deteriorate the battery and tend to predispose it to premature failure.

The nickel-cadmium battery accepts most of its charge below its gassing potential. Conversion efficiency (electrical to stored electro-chemical energy) closely approaches 100% in this area of the charge cycle provided charging rate is sufficiently high. Consequently, little battery heating occurs during MAIN charge even when very high charge rates are used. However, when the battery enters the overcharge condition, this conversion efficiency dramatically reduces, with much of the charging energy being used to produce battery heating and gassing. Unfortunately, the capacity point at which the battery enters the overcharge condition is not always constant and seems to vary with such things as battery condition, charge-discharge regimes and battery type. So even though a significant voltage rise is associated with the onset of battery gassing, sensing a voltage point to initiate an overcharge regime is not a reliable method because of the circumstances stated above as well as the more obvious one of altered battery voltage through failure of an individual cell or degradation of a number of cells.

Another consideration is that charge efficiency in the overcharge condition increases with increasing charging current (ref. P. L. Bourgault, "Studies on the Nickel-Cadmium Electrode," Thesis U. of Ottawa, February 1962). One of the aspects of the present invention is the use of high current pulse charging techniques with a tapering duty cycle during overcharge resulting in the average current eventually diminishing to a value that defeats battery self-discharge.

Clearly then, the critical area requiring accurate, precise charge control occurs only in the overcharge condition. If the battery is given excessive overcharging it will tend to overheat, and if it is given little or no overcharging it will not achieve its full rated capacity and its cells will tend to imbalanced capacities. Both of these conditions can degrade battery performance, life and maintenance requirements. In attempting to solve the charge control problem, a number of devices such as voltage regulators, voltage sensing devices, third electrode systems, Stabistors (AMP Gate Diodes) and the voltage reference cell, have been employed, with varying degrees of success in automatic charge control systems for nickel-cadmium batteries. However, these systems have not been generally accepted for various reasons; high cost, poor reliability, lack of versatility or non-compatibility with various battery systems, such as the third electrode devices which require oxygen gas pressure for their operation and therefore can be used only with the sealed cell type of battery. The undesirable feature of all these devices is that they depend on battery cell characteristics that often prove to be variable under operating conditions. Battery operating temperature and cell condition intimately affect battery electrical characteristics. Therefore, charge control systems which depend on battery characteristics for their operation will not always be precise in their control of charging currents.

SUMMARY OF THE INVENTION

The present invention provides reliable, precise and automatic charging control that will permit nickel-cadmium batteries to be better utilized.

The charge control system according to this invention use a high rate coulometer of the type disclosed in U.S. 3,302,091 of Ian H. S. Henderson, patent issued Jan. 31, 1967. This type of coulometer is unaffected by battery temperature or cell characteristics. In effect, the coulometer measures actual charge going in and out of the battery, thus the control feature is an explicit function of charge.

Coulometric charge controllers can be adapted to all types of nickel-cadmium batteries (sealed and vented) and thus appear to be practical for many applications. The coulometer itself is a rugged, reliable, relatively inexpensive device costing about as much as an individual battery cell of the same capacity rating. A single coulometer can be used to control the charging of any size of battery package (i.e. packs containing any number of cells); consequently coulometric charge control is especially attractive for large power applications, such as sonar.

According to one aspect of the invention, there is provided a coulometer controlled battery charger comprising a source of AC current adapted to be connected via first switching means to rectifying means for rectifying said AC current to produce DC current at the output thereof. The output of the rectifying means is adapted to be connected in series with a coulometer and a battery to be charged. The coulometer produces a relatively abrupt change in voltage from a first voltage to a second voltage upon passage of a predetermined net amount of charge therethrough. The coulometer is connected to sensing means responsive to said second voltage to actuate means for opening said first switching means to thereby interrupt charging of the battery.

The charger may further comprise means for disabling said means for opening said switching means for a predetermined time and for applying an overcharge to said battery for said predetermined time.

According to another aspect of the invention there is provide a coulometer controlled battery charger comprising: a silicon controlled rectifier having an anode, cathode and gate; a source of AC voltage having an output connected in series with the anode and cathode of said silicon controlled rectifier, a coulometer and a pair of terminals adapted to be connected to a battery to be charged, said coulometer producing a relatively abrupt change in voltage from a first voltage to a second voltage upon passage of a pretermined net amount of charge therethrough; a source of trigger pulses connected, via further rectifying means, to said AC source and producing pulses of predetermined frequency on each positive half cycle of the AC source, which pulses are supplied to said gate to allow charging current to flow through said silicon controlled rectifier, the coulometer and the battery; said second voltage activating means for gradually reducing to zero the frequency of pulses produced by said pulse producing means to thereby terminate charging of said battery.

The coulometer comprises an electro-chemical cell comprising a pair of reversible electrodes having substantially the same eletrode potential, such cell being adapted to contain electrolyte in contact with said electrode, and to develop a subsantial and abrupt change in the voltage between the electrodes corresponding to a change in the electro-chemical process occurring at one or both electrodes when more than a definite net amount of charge has passed through the cell.

The coulometer of the type disclosed in the aforementioned patent is believed to be the only simple, inexpensive device known to be able to function as a charge integrator. The construction and operation of the coulometer is fully disclosed in the aforementioned U.S. Pat. 3,302,091. Briefly, the coulometer comprises an electro-chemical cell having a pair of reversible electrodes immersed in an electrolyte. The electrodes have substantially the same electrode potential so that the voltage across the cell is small. The cell is adapted to develope a substantial and abrupt change of voltage between its electrodes when more than a definite net amount of electricity is passed through the cell, corresponding to a change in the electro-chemical process occurring at one or both electrodes, such as the onset of gas evolution.

Electric current passing through the cell causes oxidation of the active material at one electrode and reduction of the active material at the other electrode, the amount of oxidation and reduction being proportional to the quantity of electricity which passes through the cell. Electric current passing through the cell in the reverse direction causes the electrode reactions to proceed in the reverse directions. Passage of a quantity of electricity through the cell in the reverse direction, equal to the quantity of electricity which previously passed through in the forward direction, returns the electrodes to their initial state of oxidation. When a quantity of electricity has passed through the cell sufficient to oxidize all the active material at one electrode and/or reduce all the active material at the other electrode, further passage of electric current results in the commencement of a change in the electro-chemical process occurring at one or both electrodes. This change in electro-chemical process may be, for example, the onset of gas evolution. In the case where hydrogen is given off at one electrode, and oxygen at the other electrode, the voltage tends to rise to at least 1.23 volts since this is the theoretical minimum voltage at which these two gases can be evolved, simultaneously. The quantity of electricity that must pass through the cell before the voltage begins to rise can be automatically set at the appropriate value imposed by the electrical history of the cell, or a maximum can be set by constructing the cell with a predetermined amount of active material. The increased voltage indicates that a particular net amount of electricity has passed through the cell.

The electro-chemical cell can be constructed with a known electrical capacity (ampere-hour capacity) so that the increased potential difference will occur when the oxidation and/or reduction reaction has gone to completion in one direction. The cell can be used again simply by reversing the direction of flow of electric current through the cell.

DESCRIPTION OF THE PREFERRED EMBODIMENTS

Figure 1:
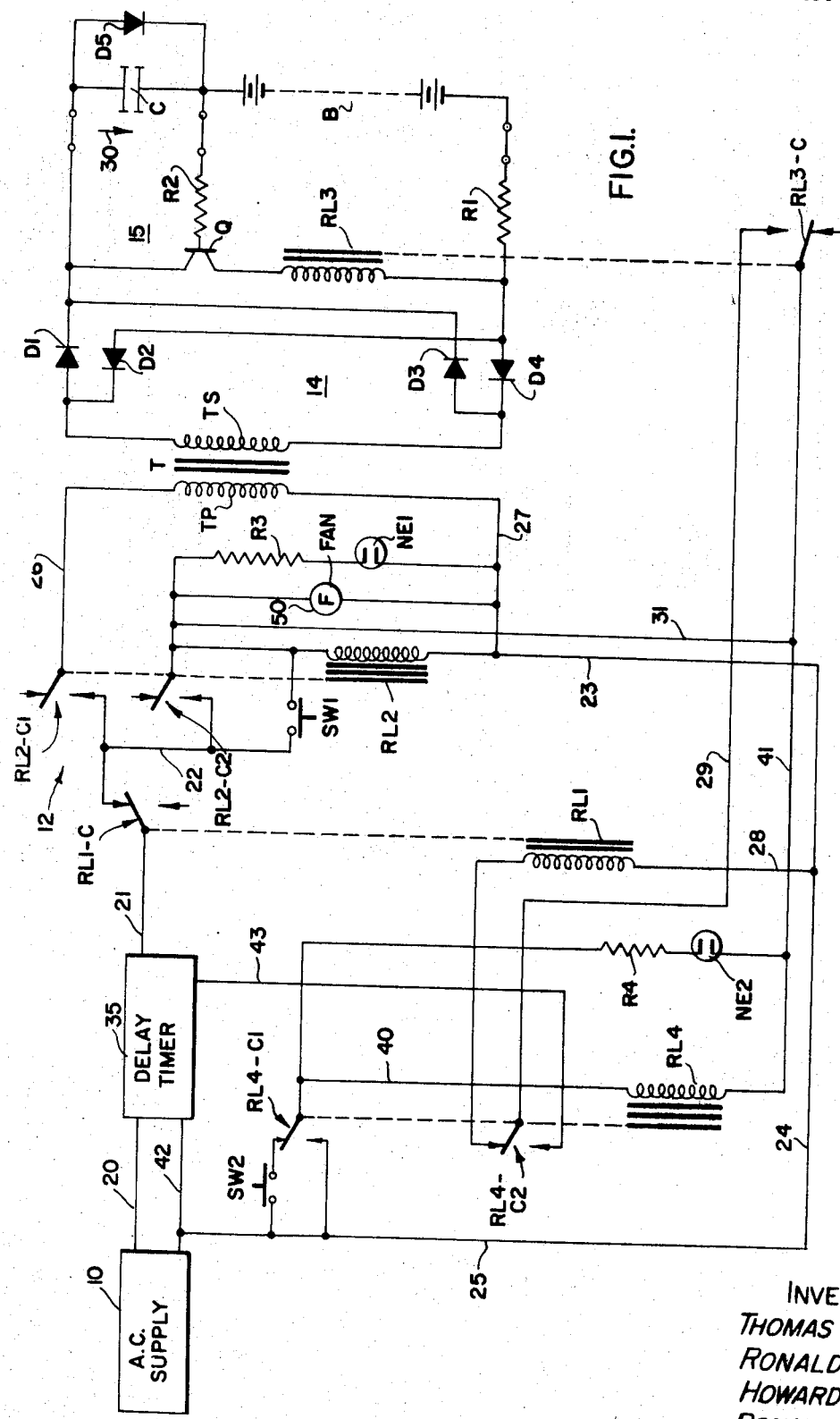
FIG. 1 is a schematic diagram of one embodiment of a coulometer controlled battery charger according to the present invention.

Referring to FIG. 1, there is shown a coulometer controlled battery charger comprising a source of AC current 10 adapted to be connected via first switching means, generally indicated at 12, to rectifying means, generally indicated at 14, for rectifying the AC current to produce pulsating DC current at the output thereof. The output of rectifying means 14 is adapted to be connected in series with a coulometer C and a battery B to be charged. The coulometer produces a relatively abrupt change in voltage from a first voltage to a second voltage upon passage of a predetermined net amount of charge through it. The coulometer integrates charge in the sense that it algebraically adds charge and discharge, i.e. net charge therethrough and only changes its voltage state or level when the integrated (net) charged exceeds a predetermined amount. The coulometer is connected to sensing means, generally indicated at 15, which is responsive to said second voltage to actuate means for opening said first switching means 12 to thereby interrupt charging of the battery. The means for opening said first switching means 12 comprises a relay RL3 having a pair of normally open contacts RL3–C. The operation of this relay will be further described subsequently.

To begin normal or MAIN charging of battery B, normally-open switch SW1 is momentarily closed. This causes the winding of relay RL2 to be energized by the AC supply 10 via line 20, delay timer 35 assumed inactive, line 21, the normally closed contacts RL1–C, line 22, switch SW1, the winding of relay RL2, line 23, line 24 and back to the AC supply 10 via line 25. This causes the normally-open contacts RL2–C1 and RL2–C2 to close. Contacts RL2–C2 act as hold-in contacts for relay RL2. That is, relay RL2 remains energized after re-opening of switch SW1. When contacts RL2–C1 close, they enable the primary winding TP of transformer T to be energized by the AC supply 10 via lines 20 and 21, contacts RL1–C, contacts RL2–C1, line 26, line 27 and lines 23, 24 and 25. The output of the secondary TS of transformer T is rectified by rectifier 14 to provide current flowing through the coulometer C and battery B as indicated by the arrow 30. The circuit will continue to charge battery B until the coulometer C produces an abrupt change in voltage from a first voltage to a second voltage upon passage of a predetermined net amount of charge through it. This rise in voltage on coulometer C biases transistor Q into conduction so that the winding of relay RL3 is energized thus closing its normally-open contacts RL3–C. When contacts RL3 close, current flows from the AC supply 10 through lines 25, 24 and 28, through the winding of relay RL1, through the closed upper contacts RL4–C2 or relay RL4, through line 29, contacts RL3–C, through line 31, the closed contacts RL2–C2, line 22, contacts RL1–C and lines 21 and 20. Thus, the winding of relay RL1 is energized to open the first switching means by causing contacts RL1–C to open. This, of course, causes the winding of relay RL2 to become de-energized so that its contacts RL2–C1 and RL2–C2 open. Also, relay RL3 is no longer energized so that its contacts RL3–C open. Relay RL1 is then no longer energized and its contacts RL1–C move back to the normally closed position shown in FIG. 1. In short, once the coulometer C indicates that the battery B has been fully charged, the charging is caused to cease and the relays RL1, RL2 and RL3 revert to the positions shown in FIG. 1.

The first switching means 12 includes the normally-closed contacts RL1–C and the normally-open contacts RL2–C1.

By means of switch SW2 and relay RL4 it is possible to activate a delay interval timer 35 rather than relay RL1 when the coulometer C indicates a fully charged condition. Once the delay interval timer 35 is activated, charging will continue for a predetermined time after which a switch in the timer opens, turning off the charger.

To activate the delay timer and provide overcharge of the battery B, switch SW1 is first closed, energizing relay RL2, as before, and thus closing contacts RL2–C1 and RL2–C2. Switch SW2 is then momentarily closed so that relay winding RL4 is energized by AC supply 10 via line 25, switch SW2, the closed upper contacts RL4–C1, line 40, line 41, line 31, closed contacts RL2–C2, line 22, closed contacts RL1–C, line 21, through the delay timer 35 and line 20 back to supply 10. This energization of the winding of relay RL4 causes the contacts RL4–C1 and RL4–C2 to move from the upper positions to the lower positions. The closed lower contacts RL4–C1 act as a hold-in for relay RL4. The closed lower contacts RL4–2 connect the delay timer 35 in the circuit as follows: from AC supply 10 via line 42, through delay timer 35, line 43, the closed lower contacts RL4–C2, line 29, the closed contacts RL3–C (closed because in overcharge coulometer C renders transistor Q conducting to energize the winding of relay RL3), line 41, line 31, closed contacts RL2–C2, line 22, closed contacts RL1–C, line 21, delay timer 35, line 20 back to AC supply 10.

After a predetermined time delay, a switch in the delay timer 35 opens turning off the charger. The winding of relay RL3 thus ceases to be energized so that it opens its contacts RL–C. This causes the winding of relay RL4 to be de-energized so that its contacts revert to the upper positions shown in FIG. 1. The timer 35 also opens the circuit to the winding or relay RL2 so that its contacts revert to the normally-open position shown in FIG. 1.

As relay RL4 is used as a hold-on type, the timed overcharge period is available at the discretion of the operator. As soon as the overcharge period is over and the charger is turned off, relay RL4 reverts to its normal position where the activating signal is fed to the winding of relay RL1 and the delay interval timer resets to the predetermined overcharge time.

A resistor R1 may be used to limit charging current through the battery B. Also, the transistor Q is provided with a suitable biasing resistor R2 so that it is normally biased "off." The rectifier 14 has been shown as a full-wave rectifier comprising diodes D1 to D4 connected as shown in FIG. 1, although half-wave rectification could be used.

An indicator light, such as a neon light NE1, is energized upon closure of switch SW1 and is maintained energized during charging through the closed contacts RL1–C and RL2–C2. A current limiting resistor R3 may be provided in series with the neon light NE1. A cooling fan 50 for the charger may be provided in parallel with R3 and NE1, as shown in FIG. 1.

A further neon lamp NE2, in series with a resistor R4, may be provided to indicate when the circuit is on overcharge. This neon light is energized as long as the relays RL4 and RL2 are energized and relay RL1 is deenergized.

Diode D5, in parallel with the coulometer C, conducts only when coulometer voltage is allowed to rise to between 0.6 and 0.7 volt. Therefore, during normal charging of the battery, current flows through coulometer C and not through the diode D5. However, when the coulometer C indicates full charge, its voltage rises so that diode D5 becomes conductive. This allows current overcharge to be applied to the battery through diode D5 without overcharging the coulometer. Overcharging the coulometer causes it to lose its integrating ability. The coulometer is connected in series with the battery to time-integrate coulombs delivered to and removed from the battery. A rise in coulometer voltage, during charging, indicates restoration of the coulombs removed during discharge of the battery. In use, the battery is discharged through the coulometer C.

Figure 2:
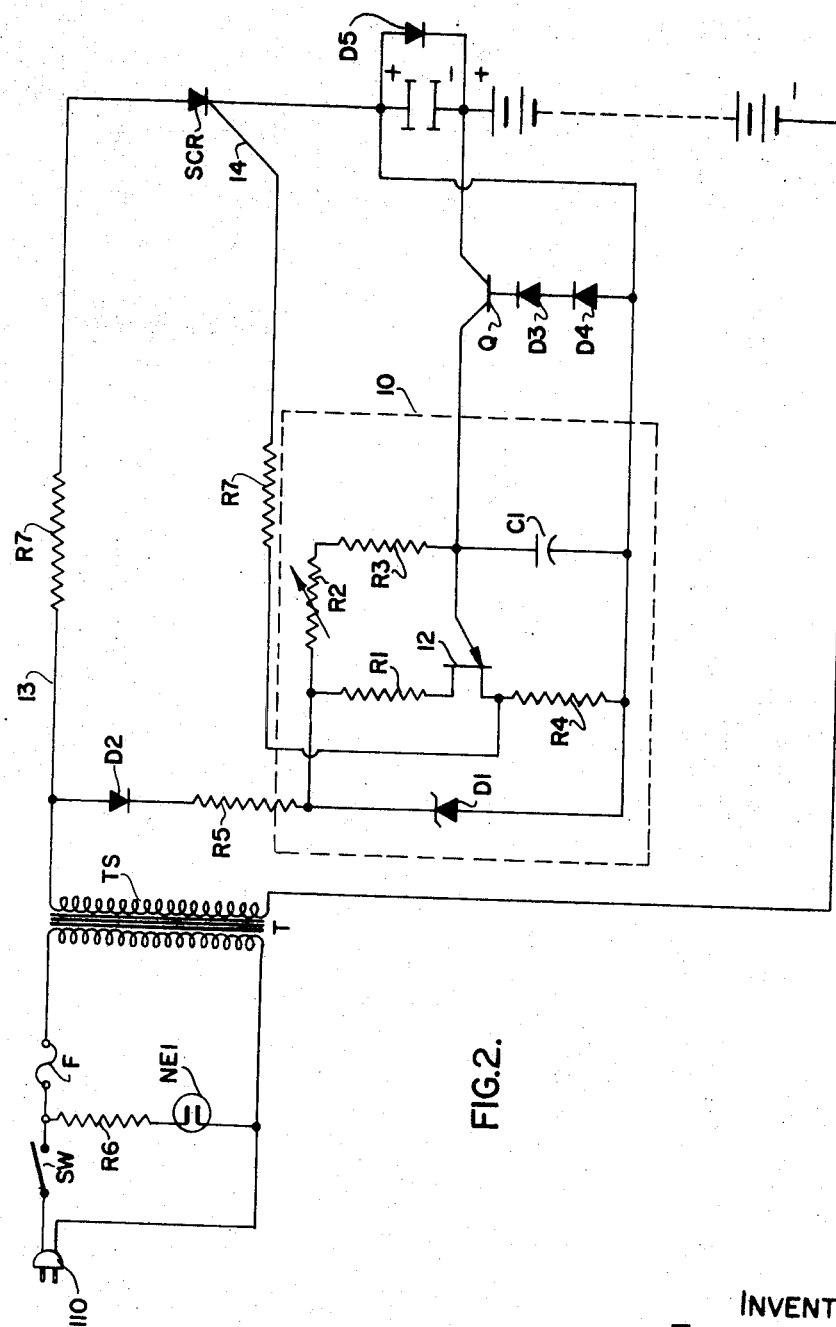
FIG. 2 is a schematic circuit diagram of a second embodiment according to the invention.

FIG. 2 of the drawings shows another embodiment according to the invention. The basic components in this circuit are a transformer 1, a silicon controlled rectifier SCR (giving half-wave rectification) and a unijunction oscillator 10.

The unijunction oscillator is of known construction and comprises a unijunction transistor 12, resistors R1 to R4 and a capacitor C1. The voltage supply for the unijunction oscillator 10 is taken across a Zener diode D1 connected in series with a resistor R5 and diode D2 to line 13 which is connected to one side of the secondary TS of transformer T. The primary TP of the transformer T is energized from an AC source, e.g. 110 v. AC, through a switch SW and, if desired, a fuse F. A neon lamp NE1 connected in series with a resistor R6 across the primary TP indicates that the charger is turned on. The battery to be charged is connected in series with a coulometer C, and SCR and a resistor R7 across the secondary TS.

The unijunction oscillator 10 produces trigger pulses on each positive half cycle of the AC supply. The frequency of these trigger pulses is determined by the variable resistor R2 and the associated resistor-capacitor network R3 and C1. These trigger pulses are applied to the gate 14 of the SCR to allow charging current to pass therethrough and through the coulometer C and battery. The frequency of the unijunction oscillator 10 determines the angle of conduction of the SCR. The rise in voltage of the coulometer (a signal that the coulometer has reached a state of full charge) triggers a transistor switch Q causing a gradual reduction in the frequency of unijunction oscillator 10 by offering an alternate discharge path for the capacitor C1 in the resistance-capacitor network of the unijunction circuit. When the coulometer voltage reaches a level determined by the setting of potentiometer R2 and the biasing elements D3 and D4 in the base of the transistor switch Q, the oscillator will shut off thereby terminating charging of the battery. Of course, the SCR will only allow current to pass through the coulometer-battery circuit when it is receiving a trigger pulse from the unijunction oscillator 10.

As soon as the charging current is turned off, the coulometer voltage will tend to return to zero. When this happens, the transistor switch Q turns off allowing the unijunction oscillator 10 to oscillate and trigger the SCR and allow a pulse of current to pass through the coulometer and battery. This current pulse causes the coulometer voltage to rise again turning off the charging current by causing the unijunction 10 to stop oscillating. This behaviour will repeat as long as the charger is energized and constitutes a coulometer controlled overcharge. It has been found that once the battery reaches the overcharge region, the time between pulses gets progressively longer and longer.

The pulses developed by the unijunction oscillator 10 are applied to the gate 14 of the SCR through a resistor R7.

The diode D5 in parallel with the coulometer C prevents any damaging overcharge current from flowing through the coulometer C for reasons explained in connection with the embodiment of FIG. 1.

What we claim as our invention is:

1. A coulometer controlled battery charger comprising a source of AC current adapted to be connected via first switching means to rectifying means for rectifying said AC current to produce DC current at the output thereof, said first switching means having a set of normally-closed contacts of a first relay and a set of normally-open contacts of a second relay, said second relay having a winding and a normally-open switch connected in series with said winding through said normally-closed contacts across said source of AC current whereby closing said normally-open switch energizes said winding to close said normally-open contacts of said second relay, the output of said rectifying means being adapted to be connected in series with a coulometer and a battery to be charged, said coulometer producing a relatively abrupt change in voltage from a first voltage to a second voltage upon passage of a predetermined net amount of charge therethrough, said coulometer being connected to sensing means responsive to said second voltage to actuate means for opening said first switching means to thereby interrupt charging of the battery.

2. A charger as claimed in claim 1 wherein said second relay has a second set of normally-open contacts connected across said normally-open switch whereby, upon momentary closure of said normally-open switch, said second set of normally-open contacts closes to maintain energization of said winding upon re-opening of said normally-open switch.

3. A charger as claimed in claim 2 wherein said means for opening said first switching means comprises a third relay having a set of normally-open contacts and a winding adapted to be energized by said sensing means when it senses said second voltage to thereby close the contacts of said third relay, the contacts of said third relay being connected across said source of AC current in series with a winding of said first relay, the second set of normally-open contacts of said second relay and the contacts of said first relay whereby closure of the contacts of the third relay causes the winding of the first relay to become energized to open its contacts.

4. A charger as claimed in claim 3 including a transformer having a primary winding and a secondary winding, the primary winding being connected across said source of AC current in series with the normally-closed contacts of said first relay and the first-mentioned set of normally-open contacts of said second relay and the secondary winding being connected to said rectifying means.

5. A charger as claimed in claim 3 wherein said rectifying means is a full-wave rectifier and said sensing means comprises a transistor having its collector-emitter path connected in series with the winding of said third relay across the output of said rectifier and its emitter-base path connected across said coulometer, said transistor being normally biased off and being adapted to become conductive in response to said second voltage whereby the winding of said third relay is energized.

6. A charger as claimed in claim 5 and further comprising means for disabling said means for opening said switching means for a predetermined time and for applying an overcharge to said battery for said predetermined time.

7. A charger as claimed in claim 6 wherein said disabling means includes a fourth relay having a winding, a set of normally-closed contacts and a set of normally-open contacts, the normally-closed contacts of said fourth relay being adapted to connect the winding of said first relay across said AC source in series with the normally-open contacts of said third relay, the second set of normally-open contacts of said second relay and the normally-closed contacts of said first relay.

8. A charger as claimed in claim 7 including a second normally-open switch adapted to connect the winding of said fourth relay across said AC sources in series with the second set of normally-open contacts of said relay and the normally-closed contacts of said first relay, energization of the winding of said fourth relay causing its normally-closed contacts to open and its normally-open contacts to close whereby the winding of said first relay is disconnected, the normally-open contacts of said fourth relay, when closed, connecting a delay timer across the AC source in series with the normally-open contacts of said third relay, the second set of normally-open contacts of said second relay and the set of normally-closed contacts of said first relay.

9. A coulometer controlled battery charger comprising: a silicon controlled rectifier having an anode, cathode and gate; a source of AC voltage having an output connected in series with the anode and cathode of said silicon controlled rectifier, a coulometer and a pair of terminals adapted to be connected to a battery to be charged, said coulometer producing a relatively abrupt change in voltage from a first voltage to a second voltage upon passage of a predetermined net amount of charge therethrough; a source of trigger pulses connected, via further rectifying means, to said AC source and producing pulses of predetermined frequency on each positive half cycle of the AC source, which pulses are supplied to said gate to allow charging current to flow through said silicon controlled rectifier, the coulometer and the battery; said second voltage activating means for gradually reducing to zero the frequency of pulses produced by said pulse producing means to thereby terminate charging of said battery.

10. A charger as claimed in claim 9 wherein said source of trigger pulses comprises a unijunction oscillator.

11. A charger as claimed in claim 10 wherein the pulse repetition frequency of said unijunction oscillator is determined by a resistance-capacitance network and said means for reducing the frequency of said pulses comprises a transistor connected across said capacitance, said transistor being normally biased "off" but being adapted to be made conductive by said second voltage to thereby offer an alternate discharge path for said capacitance.

References Cited
UNITED STATES PATENTS

| 2,531,472 | 11/1950 | Salazar | 320—31X |
| 2,885,623 | 5/1959 | Staufenberg, Jr. | 320—29X |
| 3,062,998 | 11/1962 | Medlar | 320—TDUX |
| 3,302,091 | 1/1967 | Henderson | 324—94X |
| 3,329,882 | 7/1967 | Sobel | 320—TD(UX) |
| 3,409,815 | 11/1968 | Wright et al. | 320—10X |
| 3,417,307 | 12/1968 | Kosa et al. | 320—TDUX |
| 3,417,308 | 12/1968 | Mandel et al. | 320—TDUX |
| 3,422,337 | 1/1969 | Carson | 320—40X |
| 3,431,481 | 3/1969 | Smyth | 324—94X |

WILLIAM M. SHOOP, JR., Primary Examiner

J. M. GUNTHER, Assistant Examiner

U.S. Cl. X.R.

320—31, 44, 48; 324—94